UNITED STATES PATENT OFFICE 2,357,372

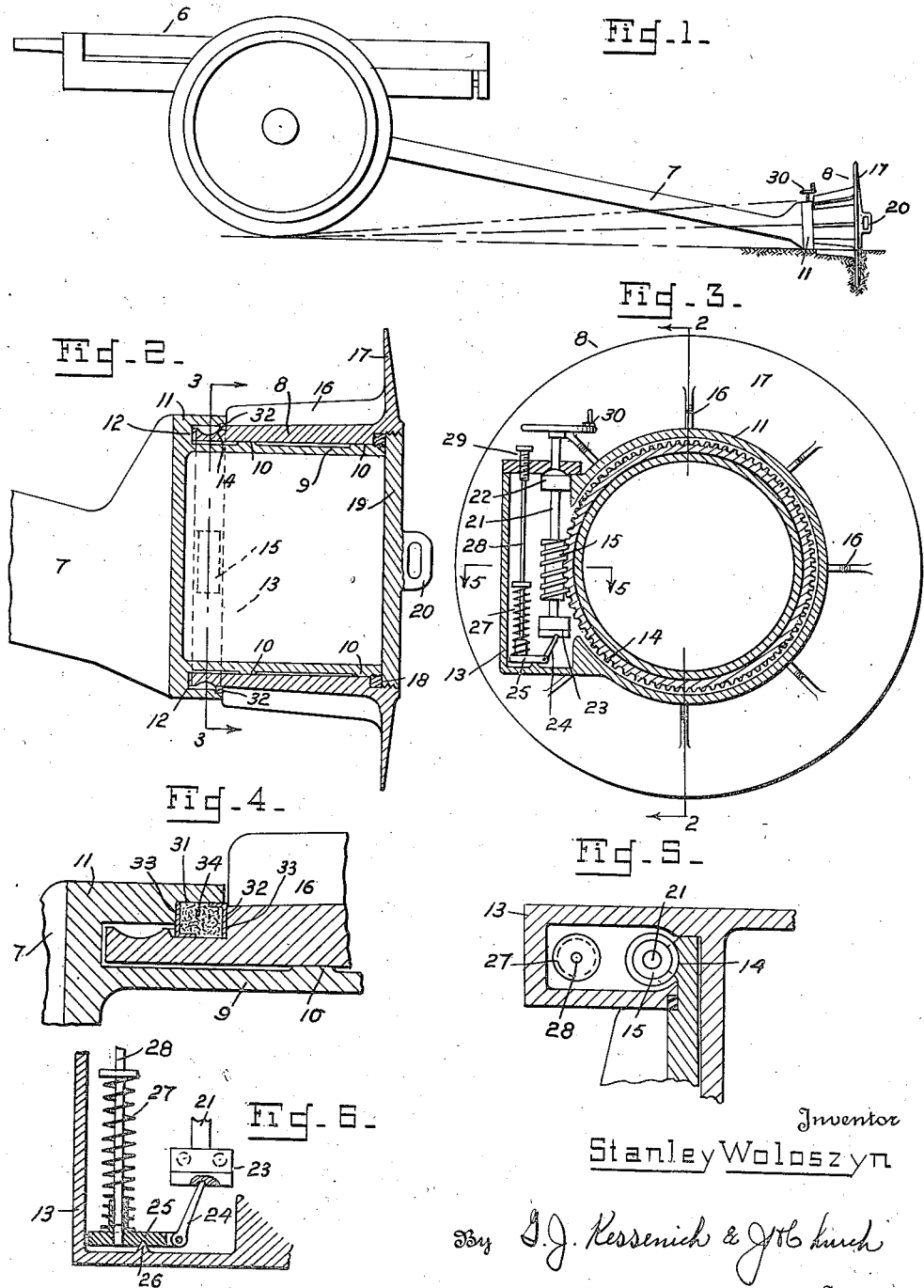

GUN TRAIL

Stanley Woloszyn, United States Army, Detroit, Mich.

Application January 5, 1942, Serial No. 425,641

5 Claims. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to field artillery gun trails and more specifically to a novel form of trail spade for such guns.

Single trail guns can only be traversed through limited angles without moving the trail. Such movement of the trail requires that the trail be lifted bodily or pried around with levers by several men. Split trail guns offer a far greater width of traverse but for meeting flank or rear attacks each trail must still be handled in a manner similar to that required by single trail guns.

It is the object of this invention to permit the rapid traverse of any type of gun to meet attack from any quarter in an easier manner than bodily lifting or prying the trail from the ground.

The specific nature of the invention as well as other objects and advantages thereof will clearly appear from a description of a preferred embodiment as shown in the accompanying drawing in which:

Figure 1 is a side elevational view of a gun embodying my invention.

Figure 2 is an enlarged longitudinal sectional view of the rotating spade.

Figure 3 is an enlarged cross sectional view of a part of the trail and spade taken on the line 3—3 of Fig. 2.

Figure 4 is an enlarged cross sectional view of portions of the trail and spade including the oil packing.

Figure 5 is a partial cross sectional view of the spade and trail taken on the line 5—5 of Fig. 3.

Figure 6 is an enlarged cross sectional view of a part of Fig. 3.

Referring to the drawing by characters of reference, there is shown in Fig. 1 a field gun 6 having a single trail 7 and provided with a rotating trail spade 8. The spade end of the trail is provided with a cylindrical extension 9 having formed on the outer surface thereof two or more circumferential raised bearing surfaces 10. Surrounding the inner end of the extension 9 is an annular band 11 formed integrally therewith and separated radially therefrom by a portion of the trail extension forming a thrust receiving shoulder 12. An opening is left in the annular band and a gear receiving box 13 is formed thereabout. The rotating frusto-conical trail spade 8 is journaled on the extension 9, and gear teeth 14 adapted to cooperate with a worm gear 15 are provided on the section of the spade received within the annular band. The remainder of the body of the spade is formed with longitudinal ribs 16 to aid in obtaining traction. The rear edge of the spade is provided with a sharp, thrust-receiving rim 17. A lock nut 18 threadably engaging the end of the extension 9 serves to retain the spade on the trail and an end plate 19 provided with a lunette 20 may be fitted to the end of the rotating spade, retaining the lubricant and providing convenient towing means. The gear box 13 above referred to may be located either at one side or at the top of the trail. Extending longitudinally through the gear box and substantially tangent to the toothed section 14 of the spade is a shaft 21 carrying the worm gear 15 engaging the teeth 14. Self-aligning ball bearings 22 and 23 are provided on either end of the shaft to reduce friction and to absorb the end thrust from the gears. Adjustable means are provided to prevent backlash and adjust the pressure between the gears. These means comprise a link 24 having one end pivotally engaging the end bearing 23 on the shaft 21 and its other end engaging a first class lever 25 rockable over a pivot 26. The inclination of the link is such that one component of the force applied will act along the shaft to prevent backlash while another component will act normal to the shaft to keep the worm gear in engagement with the ring gear on the spade. A spring 27, spring push rod 28, and adjusting screw 29 furnish a means of regulating the force exerted on the link. A crank 30 may be provided by which the shaft 21 may be rotated manually to cause rotation of the frusto-conical spade 8 or means may be provided for the application of power thereto. An annular groove 31 may be provided in the rear inner edge of the annular band 11 and an oil packing ring 32 shown in place in Figure 2, and shown in detail in Fig. 4 may be inserted therein to prevent the escape of lubricant from the gear chamber. The packing ring consists of two metal pressure receiving rings 33 and a ring of fibrous or other packing material 34 between the rings 33.

The cylindrical extension for the rotating spade is so located that the projection of its axis will intersect the ground surface at a point midway between the carriage wheels. The body or traction section of the spade forms the frustum of a cone the apex of which, if projected, would intersect at the same midpoint on the ground surface. The thrust receiving rim 17 is formed as a segment of a sphere, the center of which is at the ground surface midway between the wheels. It will be seen, therefore, that as the gun is traversed by rotating the spade, the midpoint between the carriage wheels will remain in substantially the same location. Such a relationship will enable the gun to be continuously trained on moving targets, while being traversed, with a minimum number of adjustments necessary in elevation and azimuth of the gun proper with relation to the trail and carriage. The gun can, therefore, be fired during traversing with substantially as accurate results as in the present manner. The angle through which the gun may thus be traversed is unlimited.

I claim:

1. In combination with a wheeled gun carriage having a trail, a rotatable frusto-conical member journaled on said trail and having a rear end, the forward projection of the axis of said rotating member substantially bisecting a line drawn between the bottoms of the carriage wheels at the ground level, traction ribs on said member extending longitudinally of said member for substantially the entire length thereof, a diametrically enlarged continuous rim on the rear end of said member adapted to transmit recoil thrust to the ground, and means to rotate said member about its axis.

2. In combination with a wheeled gun carriage having a trail, a cylindrical extension on the end of said trail, the axis of said extension intersecting the midpoint of a line drawn between the wheels at the ground level, a frusto-conical member journaled on said extension, means to secure the member against longitudinal movement on said extension, gear teeth on the exterior of said member, a worm gear rotatably supported by said extension in engagement with said teeth, a spade rim on said member, traction ribs on said member, and means by which said worm gear may be rotated whereby the gun carriage may be traversed.

3. A rotatable trail spade and means for rotating the spade, said means comprising a fixed gear box adjacent said spade and having an open portion in communication therewith, gear teeth on the portion of said spade opposing said opening, a shaft having one end projecting from said gear box, means on said projecting end for rotating said shaft, a self-aligning bearing engaged between said shaft and said box at the point of entry of the shaft into the box, a worm gear on said shaft in engagement with said gear teeth, a bearing cap on the inner end of said shaft, a first class lever in said gear box, adjustable means to apply pressure to one end of the lever, and a link engaged between the other end of said lever and said cap, said link being so angularly related to the lever and the cap that a component of the force applied will act to hold the worm gear in engagement with the gear teeth and another component will act along the shaft to restrain longitudinal movement thereof.

4. An extension having a rear end on a gun trail, a rotatable spade journaled on said extension, a lock nut on the rear end of said extension to prevent longitudinal movement of said spade, an end plate secured to said spade and enclosing the end of said extension, and a lunette secured to said end plate.

5. A spade for a gun trail comprising a frusto-conical member having a rear end and journaled on the gun trail, traction ribs on the periphery of said member, an annular rim on the rear end of said member and extending beyond the periphery thereof, said rim being formed in the shape of a segment of a sphere and so related to the frusto-conical member that the projected center of said segment coincides with the projected apex of said frusto-conical member, the said projected centers bisecting a line drawn between the bottoms of the carriage wheels at the ground level.

STANLEY WOLOSZYN.